Jan. 13, 1959 R. C. P. HINTON ET AL 2,868,869

PARTY LINE ELECTRICAL COMMUNICATION SYSTEMS

Filed July 18, 1955 8 Sheets-Sheet 1

FIG. I.

INVENTOR.
R. C. P. HINTON
F. W. WARDEN
BY
[signature]
AGENT

INVENTOR.
R. C. P. HINTON
F. W. WARDEN
BY
AGENT

PARTY LINE ELECTRICAL COMMUNICATION SYSTEMS

Filed July 18, 1955 8 Sheets-Sheet 3

INVENTOR.
R. C. P. HINTON
F. W. WARDEN
BY
AGENT

PARTY LINE ELECTRICAL COMMUNICATION SYSTEMS

Filed July 18, 1955 8 Sheets-Sheet 4

INVENTOR.
R. C. P. HINTON
F. W. WARDEN
BY
AGENT

Jan. 13, 1959 R. C. P. HINTON ET AL 2,868,869

PARTY LINE ELECTRICAL COMMUNICATION SYSTEMS

Filed July 18, 1955 8 Sheets-Sheet 5

INVENTOR.
R. C. P. HINTON
F. W. WARDEN

BY

AGENT

INVENTOR.
R. C. P. HINTON
F. W. WARDEN
BY
AGENT

INVENTOR.
R. C. P. HINTON
F. W. WARDEN
BY
[signature]
AGENT

PARTY LINE ELECTRICAL COMMUNICATION SYSTEMS

INVENTORS
R. C. P. HINTON
F. W. WARDEN
BY
[signature]
AGENT

United States Patent Office 2,868,869
Patented Jan. 13, 1959

2,868,869

PARTY LINE ELECTRICAL COMMUNICATION SYSTEMS

Raymond C. P. Hinton, Teaneck, and Frederick William Warden, Westwood, N. J., assignors to International Standard Electric Corporation, New York, N. Y., a corporation of Delaware Application July 18, 1955, Serial No. 522,654

16 Claims. (Cl. 178—2)

This invention relates to party line electrical communication systems and more particularly to such systems adapted for telegraph signalling.

An object of the invention is the provision of such a system in which a central station continuously and automatically calls in turn each of the outstations by means of a "query routine," and is able to control the transmission of messages from the outstations to the central station. The central station is also able to transmit with priority messages to the outstations but without interrupting any outstation which is at the moment in process of sending a message to the central station.

According to one feature of the invention each outstation is allotted a distinctive code calling signal and the central station is arranged cyclically and successively to transmit such calling signals over the party line to all of the outstations. All the code calling signals are received at each outstation and means is provided thereat for establishing a signalling channel between an outstation and the central station when the code calling signal received is the one allotted to that particular outstation and the latter is in a condition requiring it to communicate with the central station.

This and other features of the invention will be better understood from a reading of the following description taken in conjunction with the accompanying drawings, in which Fig. 1 is a layout diagram of the system with respect to which a general description will first be given.

The system comprises a central station MS and, for example, ten outlying party-line stations or outstations such as OS1, OS2, OS3–OS10. The equipment at the central station MS comprises a multi-vibrator MV1 which generates two trains of pulses which will be termed "A" and "B" pulses, a control circuit CC for controlling electronic switching operations, an element timer ET and code sequence selector SS, a space-mark transmitting circuit SP, a hunting circuit F and a plurality of connecting circuits T1, T2, T3, etc.

The equipment at each outlying station comprises a start-stop multivibrator circuit MV2, a shifting storage register R, and a control circuit CC1 for controlling electronic switching operations.

At the central station the multivibrator MV1 produces positive 100 microsecond rectangular "A" and "B" pulses which are interlaced so that they occur in specific relationship to the teleprinter waveform used, or say, every 11 milliseconds (ms.). The "A" pulses occur precisely in the middle of the teleprinter baud whilst the "B" pulses coincide with the leading edge of the baud.

At each outstation the multivibrator MV2 is controlled on a start-stop basis responsive to the application of positive potential to a space lead S under the control of a line relay LRT, and generates "A" and "B" pulse trains having the same pulse repetition frequency as the "A" and "B" pulses generated at the central station and timed so that the "A" pulses at the outstation are coincident with "B" pulses at the central station and "B" pulses at the outstation are coincident with "A" pulses at the central station.

When the system is put into operation, an element timer such as a multi-gap element counter tube ET at the central station MS is stepped under control of "A" and "B" pulses generated by the multivibrator MV1, and in conjunction with the control circuit CC an element timer ET controls the space-mark transmitting circuit SP to cause a transmitting relay TR to send out on the line a readying signal, i. e., a long space signal of 176 ms. duration followed by a mark signal of 44 ms. to ensure quiescent line conditions. This signal combination which readies the circuit, is followed by the call letter of one of the outstations, say No. 3. (Each outstation is arbitrarily assigned a letter in the teleprinter code consisting of three marks and two spaces.) The code selector SS at the central station MS may comprise a multi-gap counter discharge tube each position of which is so connected to a rectifier matrix as to control, in conjunction with the control circuit CC and "A" and "B" pulses generated by the multivibrator MV1, the transmission to line of a particular call letter preceded by a long initial start space and followed by a long mark. This last-mentioned long mark is adjusted to be longer than the longest transmission delay time to the farthest outstation on the circuit, thereby allowing sufficient time for the station being called to reply automatically should there be a message on hand for transmission to the central station.

At each outstation the long initial space (176 ms.) sent to line from the central station releases a line relay LRT and by applying positive potential to a space lead S starts the multivibrator MV2 to generate "A" and "B" control pulses. The individual call letter of the outstation received by the line relay LRT is decoded in the register R which in conjunction with the control circuit CC1 detects the proper code elements of only its own call letter and ignores all others. Only this outstation (No. 3) continues the sequence of operations under control of "A" and "B" pulses, all others being released. If no message is awaiting transmission at station No. 3, nothing further happens there, and at the central station, on termination of the long mark following the code elements, the sequence is repeated by stepping the code selector gas tube SS to its next position to cause the next outstation code to be transmitted.

If a message is awaiting transmission at outstation No. 3, the operator thereat will have actuated a send key K energizing a relay MSR. In these circumstances, on the next "B" pulse a relay WR in the control circuit CC1 is operated, which in turn causes a relay SRT to put the line to space for a period greater than 1½ elements and less than 3 elements (say for 55 ms.). The receipt of this space by the line relay LR at the central station MS, before the termination of the long mark following the code elements, initiates in the control circuit CC a discriminative operation which constitutes an answer signal. This prepares the central station to receive a message from outstation No. 3 by causing a hunting switch F to seize a free connecting circuit such as T2, a signal from which causes the element timer gas tube ET, in conjunction with the control circuit CC, to send to line a special "transmit" code (start space 4 elements of space and continuous mark), which is stored in register R at the selected outstation. Register R in conjunction with the control circuit CC1, causes the operation of a relay TXR which by opening the line at contacts TXR1 and energizing the transmitter motor at contacts TXR2 initiates the transmission of the waiting message from the outstation tape transmitter T to a receiving position reached over the connecting circuit T2.

Provision may be made for generating at will a long space at the central station to restore the equipment at all outstations. An outstation, once relay TXR is operated, can release all the other outstations and the control station by releasing key K and relay MSR, which latter opens the line at its contacts, thereby putting it to the space condition.

If the central station wishes to call a particular outstation out of turn this may be done by transmitting a special code which is received in the register R at each outstation and prohibits the operation of relay TXR and thus the transmission of a waiting message at any outstation. The wanted outstation code is then sent from the central station and the operation proceeds as already described. The message sent from the central station is received by a teleprinter RP. Alternatively the special code may be repeated instead of sending the station code, in which case all the outstations are called simultaneously for a broadcast message.

The line relays LR, LRT may be known types of polar relays having biassing windings which adapt them to work in non-polar single current signalling circuits.

The operation of the system will now be described in detail with reference to Figs. 2 to 8. The trigger gas tubes in these circuits are of the quick acting type, the construction and operation of which are fully described in Patent No. 2,631,261 issued March 10, 1953. In many cases the outputs of the gas tubes are jumpered to various points in the circuits which in some cases had unavoidably to appear on other figures. In order that the drawings should not be unduly complicated, continuous connections from one circuit to the other have not been shown in all instances, but the output leads from the gas tubes have been indicated by a reference which is repeated at all the points to which this output is supposed to be connected. For example, the multi-gap element timer gas tube ET, Fig. 4, is provided with output leads ET1, ET2, ET3, etc., respectively connected to its various cathodes. These output leads are selectively jumpered, for instance, to the rectifier gates shown in Figs. 3 and 5, and the conductors connected to these rectifier gates are given similar references.

Figure 2:
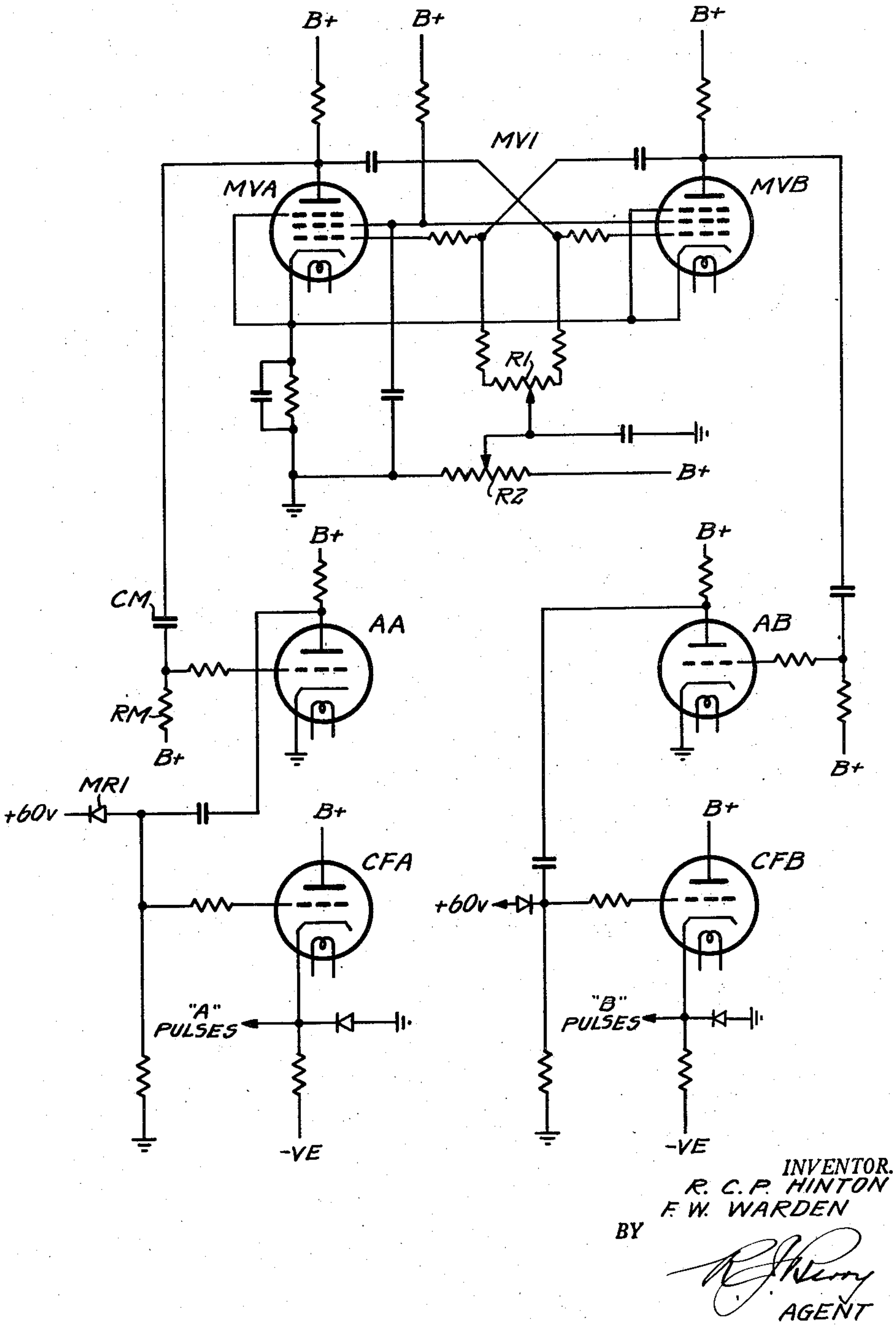
Fig. 2 shows a pulse generating multivibrator circuit used at the central station.

At the central station there is provided a stable multivibrator MV1 of well-known form comprising a pair of pentodes MVA, MVB, Fig. 2. This multi-vibrator generates two pulse trains which are 180° out of phase and interlaced so that they will occur in specific relationship to the teleprinter wave form. By means of the ratio control potentiometer R1 and the frequency control potentiometer R2, the pulse repetition frequency is adjusted to be equal to the baud speed of the telegraph channel. The pulses generated by the multi-vibrator are MVA, MVB, are differentiated by networks such as CM, RM, amplified by tubes AA and AB, clipped by rectifiers such as MR1 with tubes CFA, CFB acting as cathode follower output tubes to produce two series of rectangular timing pulses designated respectively "A" pulses and "B" pulses. The "B" pulses coincide with the leading edge of the teleprinter baud, whilst the A pulses occur precisely in the middle of the baud. These A and B timing pulses are used, as will be subsequently described, for controlling the circuits of the equipment at the central station.

Figure 3:
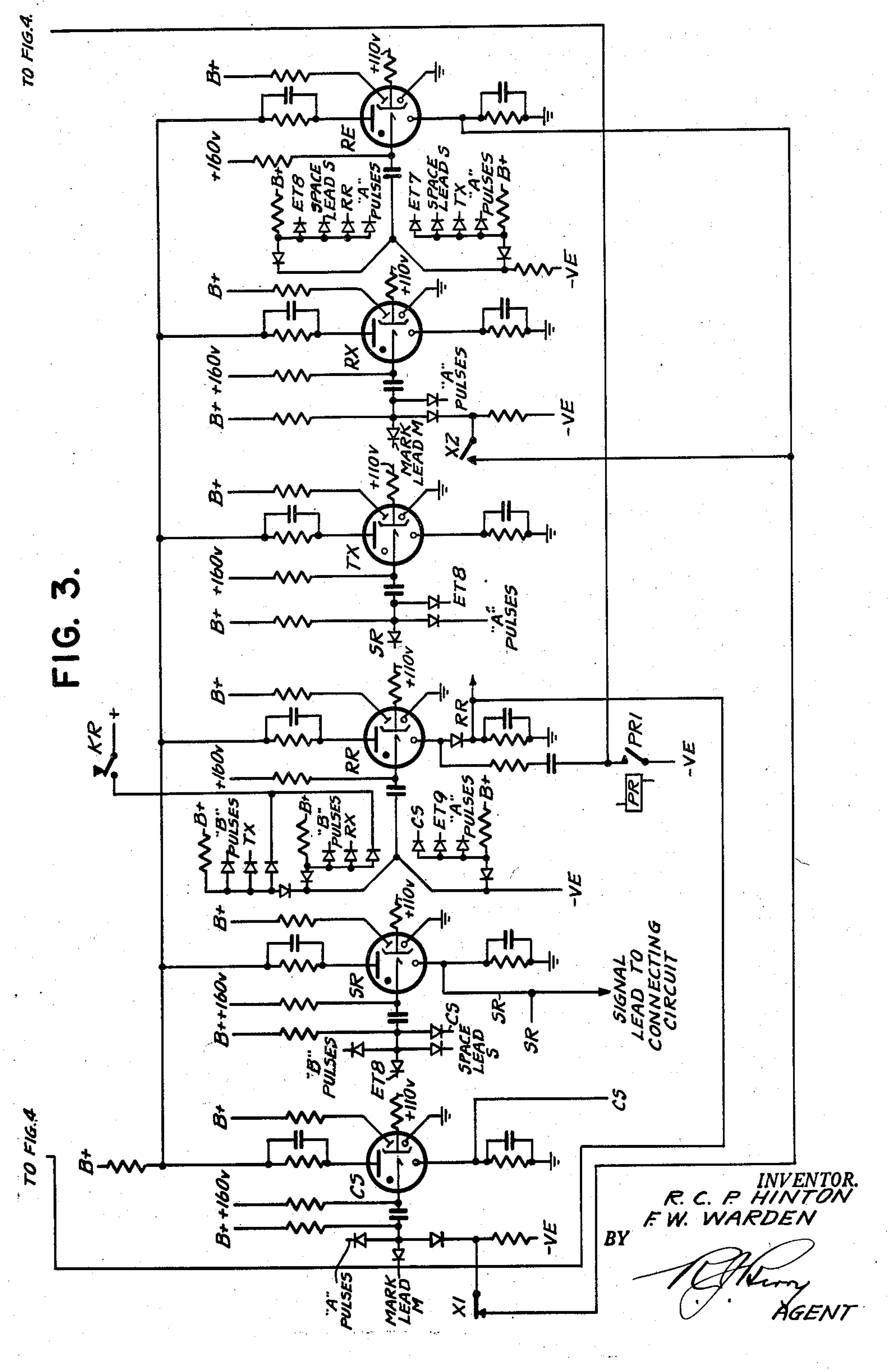
Fig. 3 shows an electronic control circuit used at the central station.
Figure 4:
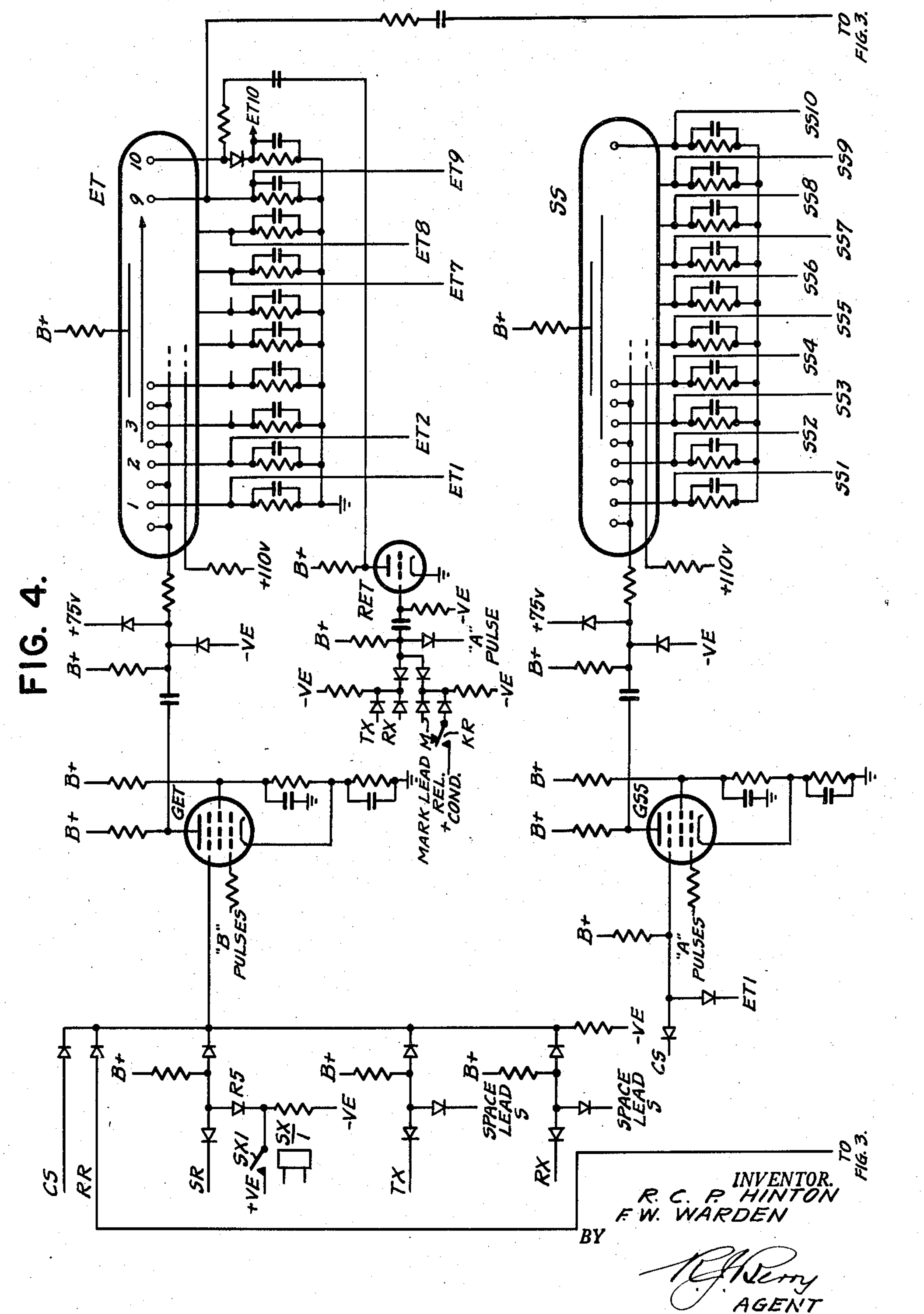
Fig. 4 is a circuit diagram of the element timer and code sequence selector at the central station.

When the power is switched on at the central station a relay PR, Fig. 3, operates and, after a short interval, at contacts PR1 applies a negative potential to the cathode of gas tube RR causing this tube to conduct. Relay PR also applies negative potential to the cathode No. 9 of the element timer tube ET, Fig. 4. This tube ET is a multi-electrode gas counter tube of the kind fully described in U. S. Patent No. 2,553,585, issued May 22, 1951. Cathode No. 9 now conducts. Since positive bias from the cathode of tube RR, Fig. 3, is now received over the lead RR at the suppressor grid of the element timer gating pentode GET, Fig. 4, the next B pulses applied to the control grid of the tube GET are passed by this tube to the transfer cathodes of the element timer ET which now steps, the discharge remaining on successive main cathodes for a time equal to the pulse interval. Thus the first B pulse occurring after tube RR is made to conduct causes the timer ET to step from cathode 9 to cathode 10.

Figure 5:
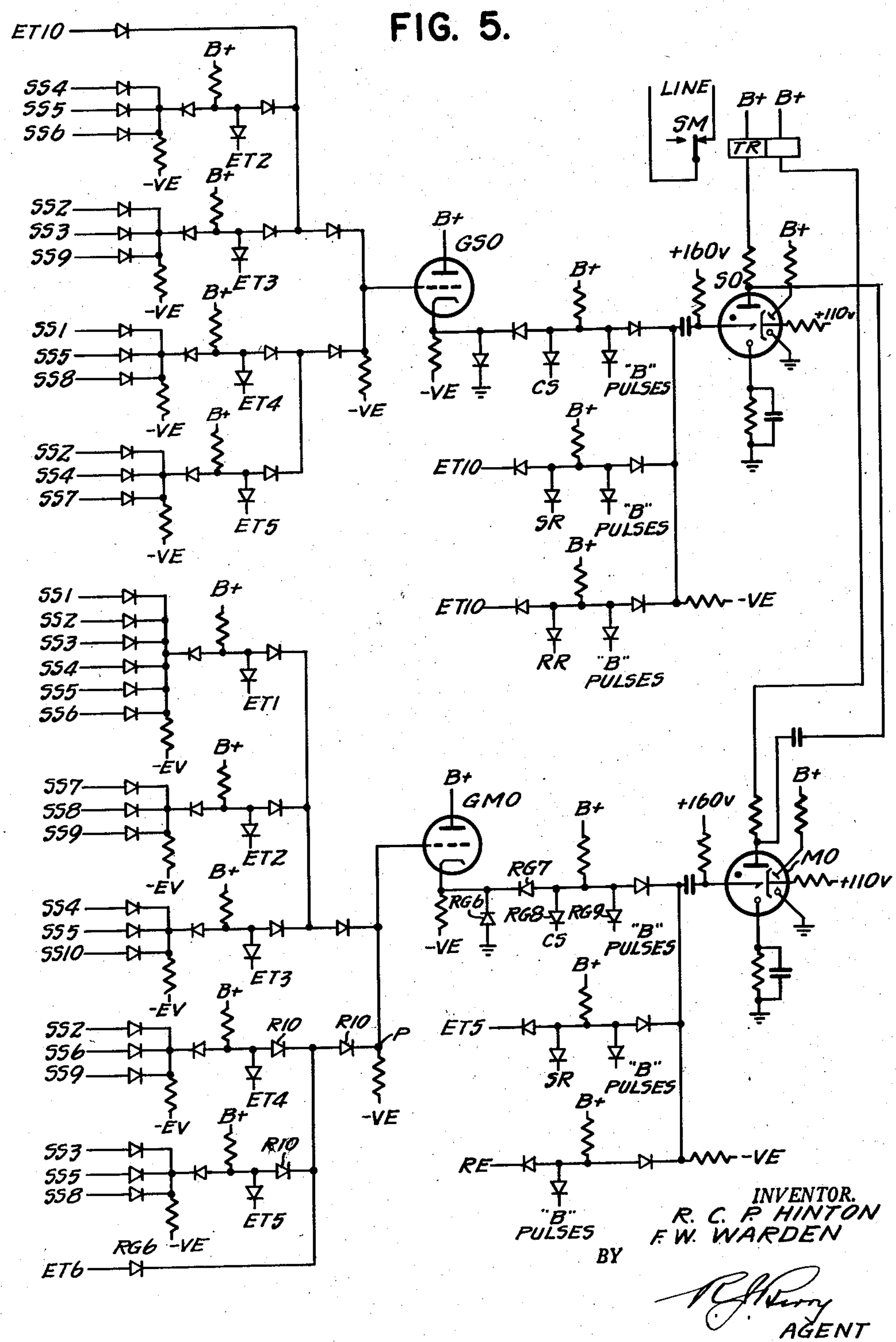
Fig. 5 shows the mark and space transmitting circuit at the central station.

The second B pulse causes the timer ET to step from cathode 10 to cathode 1, and since a rectifier gating network to the trigger electrode of a space output gas tube SO, Fig. 5, allows a pulse to pass upon the coincidence of a B pulse with tube RR conducting and cathode No. 10 of timer ET conducting, the gas tube SO will be caused to conduct. In this condition a differential telegraph transmitting relay TR in its anode circuit will be operated and will put the line to space.

The third, fourth, fifth, sixth, seventh, eighth and ninth B pulses cause the timer ET to step from cathode 1 to cathode 8. During this time interval none of the rectifier gates to any of the tubes at the central station will have allowed an A pulse to pass, but the A pulse occurring midway between the ninth and tenth B pulses will cause a gas tube RE, Fig. 3, to conduct, since one of the rectifier gates of tube RE opens with a coincidence of ET8, bias on lead RR, an A pulse and space condition on the line indicated by line relay LR applying, at contacts LR1, 60 volts positive on the space lead S (see Fig. 1) since the line relay LR is released at the time transmitting relay TR is operated to put the line to space. In the break condition of contacts LR1 with the line at space current flows from ground through the rectifier and resistance to negative battery holding the lead S at ground potential. In the other contact condition this rectifier is blocked and 60 volts positive applied to the lead S.

When gas tube RE conducts, the anode potential of the ionized tube RR is reduced to such an extent that it is unable to maintain its discharge and is extinguished and bias removed from the suppressor grid of tube GET, Fig. 4, so that the tenth B pulse will not be effective to step the element timer tube ET, but this B pulse in cooperation with tube RE conducting, causes the mark output tube MO, Fig. 5, to conduct which operates the differential transmitting relay TR thus putting the line back to mark.

It will thus be seen that the line will have remained at space for a time equal to eight elements (8 "B" pulses) which equals a period of 176 ms. for a 45 Baud telegraph system.

As soon as tube MO has started to conduct and the line has been put to mark, the first A pulse to mature after this will strike the tube CS, Fig. 3. Tube CS conducting extinguishes tube RE and over lead CS changes the bias on the suppressor grid of the gating tube GET, Fig. 4, whereby the element timer tube ET is again caused to step on B pulses.

The first and second B pulses next applied cause tube ET to step to cathodes 9 and 10, respectively.

The third B pulse steps tube ET to cathode No. 1 and this pulse with tube CS fired and bias on lead ET10 causes the space tube SO, Fig. 5, to conduct, which causes transmitting relay TR to put the line to space. It will be noted that the space tube SO was extinguished when the potential of its anode was reduced by the igniting of the mark tube MO. It will also be noted that at this time the introductory long space has been followed by a short mark, following which a station call letter is transmitted corresponding to the firing position of the multigap gas discharge counting tube SS, Fig. 4.

The A pulse immediately following the third B pulse steps the tube SS one cathode from say, cathode No. 10 to cathode No. 1, since the gating tube GSS has been opened to A pulses by the firing of tube CS with the element timer tube ET in position No. 1. The calling code now sent to line will be that for the outstation corresponding to position No. 1 of tube SS and from the examination of the manner in which the output leads SS1, SS2, SS3, etc., from the tube SS and the output leads ET1, ET2, etc., from the element timer tube ET, are jumpered to the rectifier gate networks connected to the grids of thermionic gating tubes GSO and GMO, Fig. 5, coupled, respectively, to the space and mark output tubes SO and MO, it will be seen that the code now sent will be M, M, M, S, S (mark, mark, mark, space, space).

Referring to Fig. 5 it will be noted that positive potential on, say, the lead ET6 will block rectifier RG6 causing the potential to rise at point P and the tube GMO to conduct. The resulting rise in potential at the cathode of tube GMO will block the rectifiers RG6, RG7 and if, coincidentally, positive potential is applied to lead CS from tube CS to block rectifier RG8, and a B pulse is applied to rectifier RG9, the resultant positive potential on the trigger electrode of tube MO will cause that tube to fire. Positive potential on any one of the leads SS3, SS5, SS8 coincidental with positive potential on lead ET5, or positive potential on any one of the leads SS2, SS6, SS9 coincidental with positive potential on lead ET4 will similarly cause the grid of tube GMO to go positive. R10 are decoupling rectifiers. The above description is typical of the operation of the rectifier gates in all the figures and it is not considered necessary further to describe them.

Resuming the operation: With element timer ET on cathode No. 1 and tube CS conducting, and with sequence tube SS also on cathode No. 1, the fourth B pulse causes the mark output tube MO to conduct which operates the transmitting relay TR to put the line back to mark and at the same time advances the element timer ET to cathode No. 2.

The fifth, sixth and seventh B pulses step timer tube ET to cathodes 3, 4 and 5, respectively, and in position 5 the potential of the grid of the gating tube GSO is modified and the tube SO is caused to conduct which again puts the line to space.

The eighth B pulse steps timer tube ET to cathode 6 and causes the mark output tube MO to conduct, putting the line to mark. The ninth B pulse steps timer tube ET to cathode 7.

It will thus be seen that, assuming that this is a 45 baud telegraph system, there has been sent to line 22.2 ms. of space, followed by 66.7 ms. of mark, followed by 44.4 ms. of space and the line then returned to mark. That is, there has been sent a start signal space then three elements of mark followed by two elements of space (M, M, M, S, S) after which the line has been returned to mark.

The tenth and eleventh B pulses, respectively, step the element timer tube ET to cathodes 8 and 9. If at this moment the telegraph line is in the space condition, negative potential will be on the space leads and hence tube SR, Fig. 3, will strike and will extinguish tube CS. It will be noted that the anode connections of all the sequence control tubes CS, SR, etc., of Fig. 3, are commoned so that the igniting of any one of these tubes will extinguish any one of the others which may at the time be fired. Since at this time mark output tube MO, Fig. 5, is conducting, the telegraph line can only be at space because a tributory station has put it in that condition (message waiting) and the sequence of events in these circumstances will be described later.

Assuming that the tube SR does not strike in the ninth position of timer tube ET and tube CS is still conducting, the next A pulse following the eleventh B pulse will cause the striking of tube RR, which will in turn extinguish tube CS.

The twelfth B pulse will now be passed by the gating tube GET, Fig. 4, to step the timer tube ET to cathode 10 (by virtue of the RR cathode potential gate to tube GET) and the sequence of events previously described for transmitting the introductory long space, as previously described, will follow, since this twelfth B pulse corresponds to and does the same as the first B pulse which caused timer ET to step to cathode 10 the first time.

After the long introductory space followed by the short mark has been transmitted, the sequence previously described will follow except that the sequence tube SS, Fig. 4, will be stepped to cathode No. 2 by the A pulse immediately following the third B pulse. As a result, the station code that will now be sent is M, M, S, M, S, and the striking of the space output and mark output tubes SO and MO will differ in time accordingly as can be seen from an examination of the ET and SS lead connections to the rectifier gating networks in Fig. 5.

Figure 1:
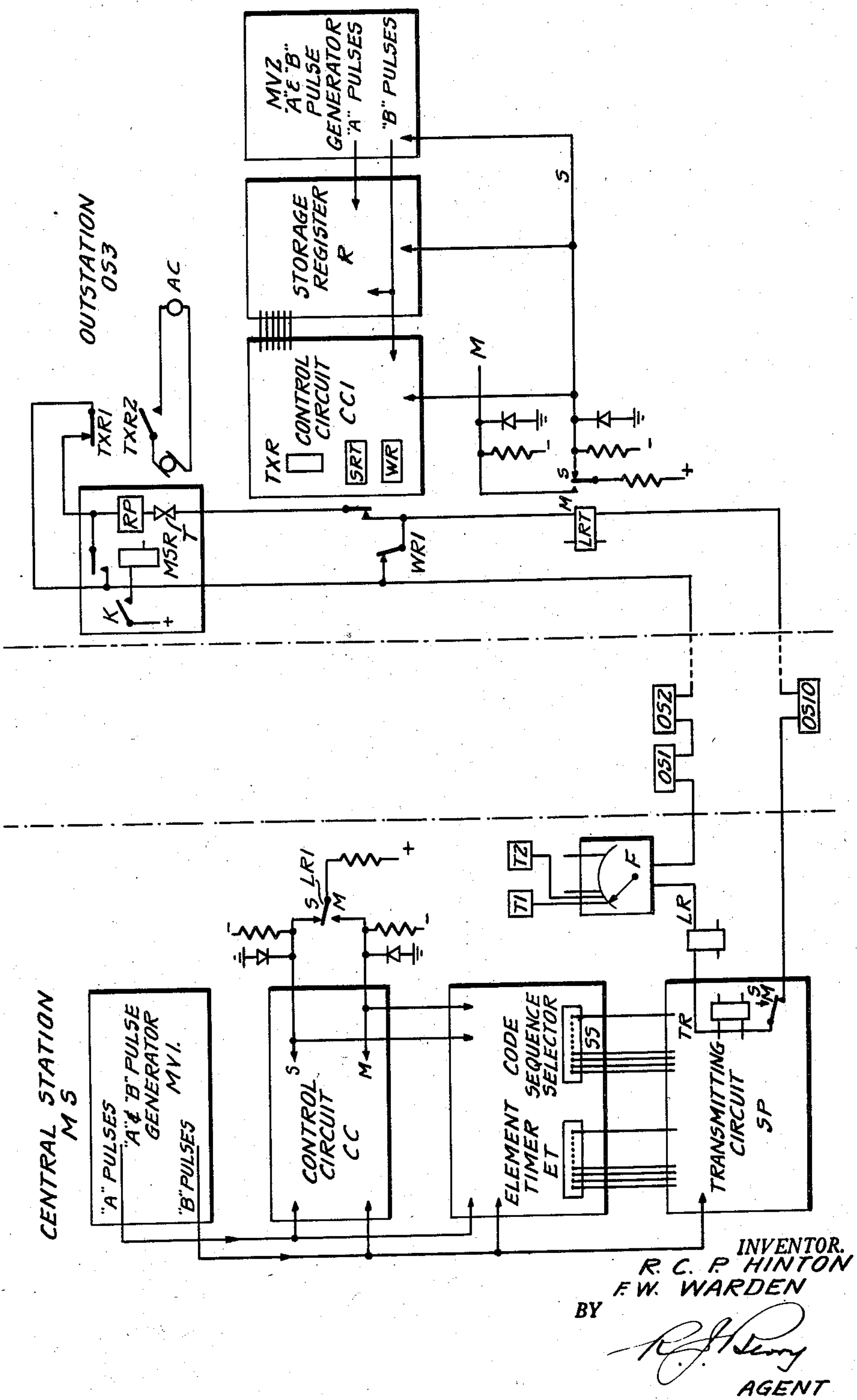

Whilst the main controlling station is operating as described above, all of the outstations will operate in the manner about to be described with reference to the equipment at one tributory station, illustrated in Fig. 1 and in Figs. 6 to 8.

Figure 6:
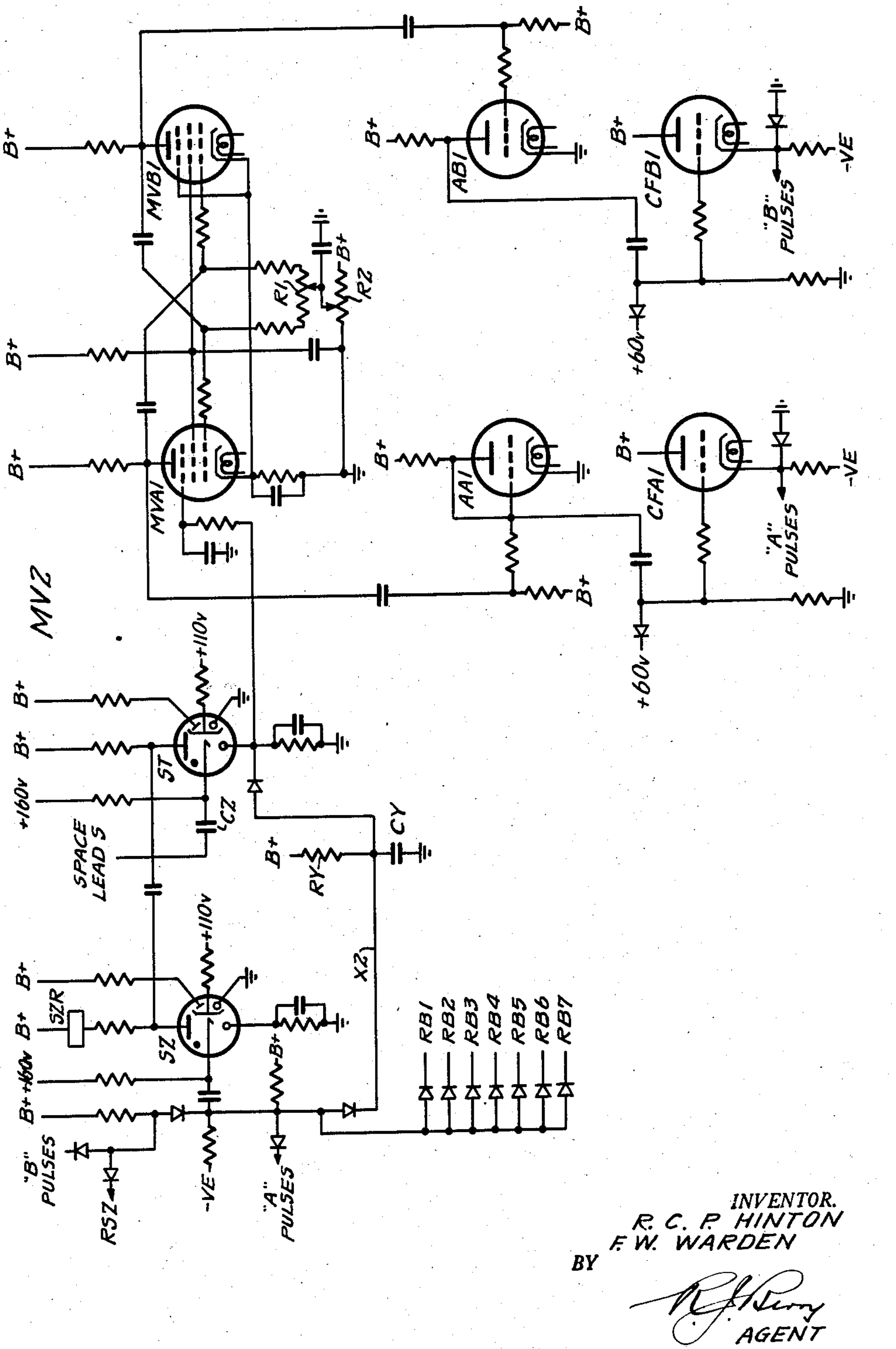
Fig. 6 shows the pulse generating multivibrator circuit and start-stop control circuit therefor at an outstation.

Each outstation is provided with a multi-vibrator circuit, Fig. 6, comprising tubes MVA1, MVB1, AA1, AB1, CFA and CFB for generating A and B pulses. The multi-vibrator of Fig. 6 is similar to that of Fig. 2 but the running of the multi-vibrator is under the control of a binary pair of gas tubes SZ, ST.

On switching on the power none of the cold cathode tubes at the outstation are caused to conduct but when the long introductory line space is sent from the central station, the line relay LRT (see Fig. 1), will release and at its contacts LRT1, the space leads will be connected to positive battery (60 volts) causing gas tube ST, Fig. 6, of the binary pair to conduct. Bias will thereby be removed from the suppressor grid of the multi-vibrator tube MVA1 causing the multi-vibrator to run, whereby B pulses are produced at the cathode of tube CFB1 and A pulses are produced at the cathode of CFA1. The pulse repetition frequency of these pulses is arranged to be the same as that of the corresponding pulses at the central station, and if perfect line signals and no transmission delays are assumed, it will be seen that A pulses at the tributory station are coincident with B pulses at the central station, and B pulses at the out-station are coincident with A pulses at the central station. The sequence of events which now takes place at the outstation upon the generation of A and B pulses thereat, is as follows the times from the leading edge of the long introductory space signal on the line being given in parentheses as an example of a 45 baud telegraph system.

Figure 7:
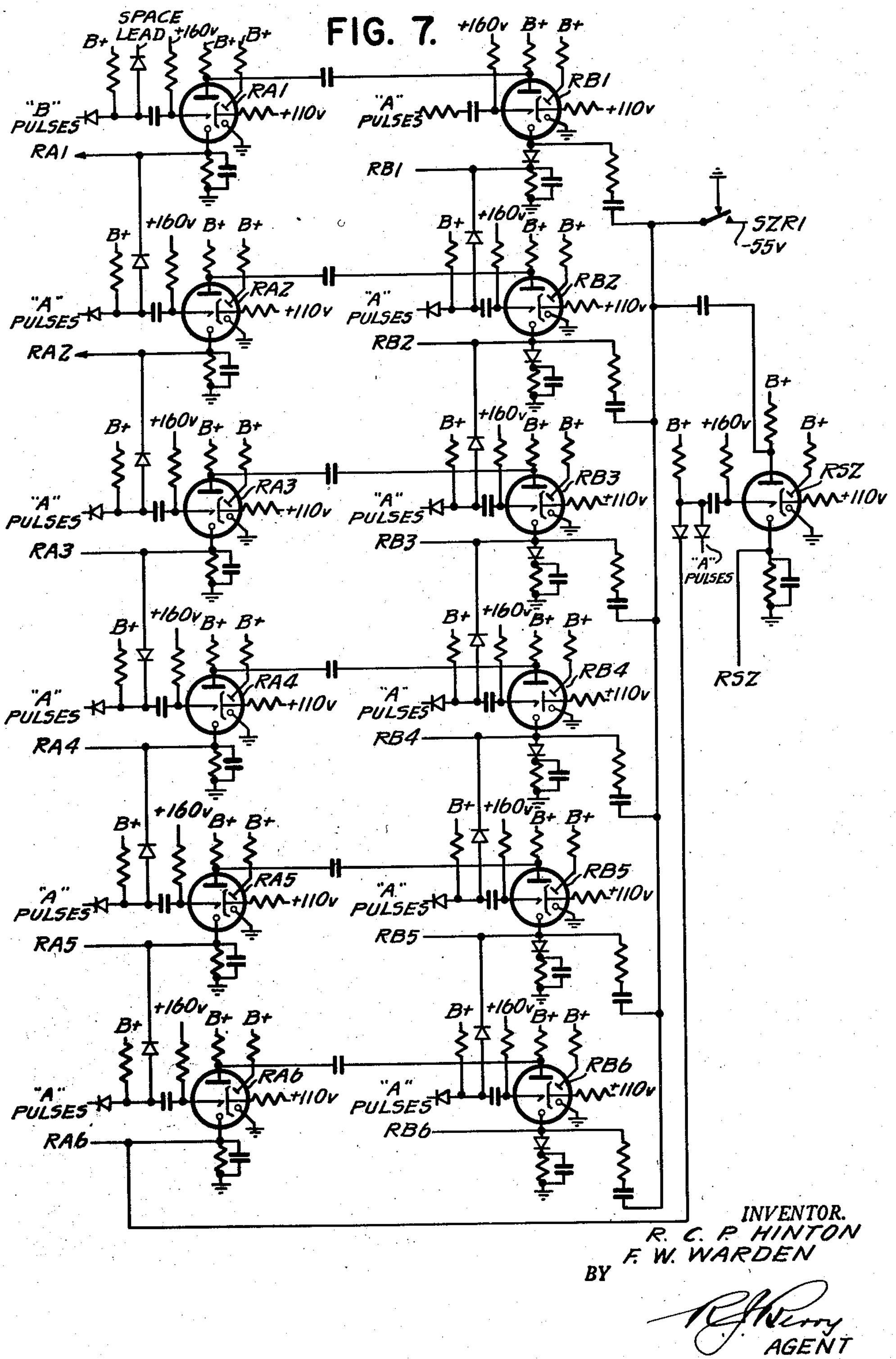
Fig. 7 shows the circuit of the shifting register at an outstation.

Referring first to the shifting register storage circuit of Fig. 7, and assuming that the column of gas tubes RB1, RB2, RB3, etc., are fired:

(*a*) The first A pulse coincident with the leading edge of the line space signal does nothing (time 0 ms.).

(*b*) The first B pulse in cooperation with +60 volts on the space lead causes tube RA1 to conduct which extinguishes tube RB1 (time 11.1 ms.).

(*c*) The second A pulse causes tube RB1 to conduct, which extinguishes RA1 and also in cooperation with RA1 cathode potential, which is slow to decay, causes tube RA2 to conduct (time 22.2 ms.).

(*d*) The second B pulse, as in (*b*) above, causes tube RA1 to conduct which extinguishes RB1 (time 33.3 ms.).

(*e*) The third A pulse as in (*c*) above causes tube RB1 to conduct, which extinguishes RA1 and also causes RA3 to conduct in cooperation with RA2 cathode potential (time 44.4 ms.).

(*f*) The third B pulse as in (*b*) above, causes tube RA1 to conduct which extinguishes RB1 (time 55.6 ms.).

(*g*) The fourth A pulse as in (*c*) above causes tube RB1 to conduct which extinguishes RA1 and also causes RA4 to conduct in cooperation with RA3 cathode potential (time 66.7 ms.).

(*h*) The fourth B pulse as in (*b*) above causes tube RA1 to conduct which extinguishes RB1 (time 77.8 ms.

(*i*) The fifth A pulse as in (*c*) causes tube RB1 to conduct which extinguishes RA1 and also causes RA5 to conduct in cooperation with RA4 cathode potential (time 88.8 ms.).

(*j*) The fifth B pulse as in (*b*) causes RA1 to conduct which extinguishes RB1 (time 100 ms.).

(*k*) The sixth pulse as in (*c*) causes RB1 to conduct which extinguishes RA1 and also causes RA6 to conduct in cooperation with RA5 cathode potential (time 111.1 ms.).

(*l*) The sixth B pulse as in (*b*) causes RA1 to conduct which extinguishes RB1 (time 122.2 ms.).

(*m*) The seventh A pulse as in (*c*) causes tube RB1 to conduct, which extinguishes RA1 and also causes tube RSZ to conduct in cooperation with cathode potential from tube RA6 (time 133.3 ms.).

(*n*) The seventh B pulse as in (*b*) causes tube RA1 to conduct extinguishing tube RB1, and also in cooperation with RSZ cathode potential causes gas tube SZ of the binary pair SZ, ST, Fig. 6, to conduct. Tube SZ upon igniting lowers the potential at the anode of tube ST to a value insufficient to maintain its discharge, and tube ST is extinguished, preventing any further cycling of the multi-vibrator MVA1, MVB1, and hence the generation of any more A and B pulses. However, due to the coincidence of the B pulse with RSZ cathode potential and the space lead which is still at +60 volts, the gas tube REL of the sequence control circuit of Fig. 8, fires (time 144.4 ms.).

(*o*) After a short period the cathode potential of tube REL rises to a sufficient value to trigger gas tube FN (time approximately 145 ms.).

(*p*) About 10 ms. later a relay SZR, Fig. 6, in the anode circuit of tube SZ will operate, and at its contacts SZR1, Fig. 7, will apply negative potential to the cathodes of tubes RB1 to RB6, causing them to conduct and extinguish RA1 to RA6. At the same time this negative potential is applied to the anode of tube RSZ causing it to become extinguished. Gas tube ST, Fig. 6, cannot be triggered again until the space lead goes to ground potential and then back to +60 volts as only the differentiated space lead wave form is admitted to the trigger of tube ST due to the differentiating action of condenser CZ. This implies that the line must return to mark before tube ST can be retriggered. Hence, as far as an outstation is concerned, providing the line is at space for any period greater than 144.4 ms., the above sequence of events will prevail initially. If the start space should be less than half the character element width, the line is not at space condition when the first A pulse occurs in the outstation, and a gating condition will be produced on wire X2, Fig. 6, with all the tubes RB1, RB2, RB3, RB4, RB5 and RB6, Fig. 7, fired. This will cause the slow rise circuit constituted by resistor RY and condenser CY to charge and apply a positive pulse to the cathode of tube ST. This will cause ST to extinguish and the circuit will be reset to normal. Thus the circuit is now ready to receive the next signaling character without having to wait until it goes through a normal cycle of 7½ elements. This is called the "false guard" and is necessary in telegraph decoders where they are used with relay switching systems.

When the line goes back to mark at the central station preparatory to the calling code being set to line, the circuits at the outstation behave as follows:

(*a*) When the line goes to space by virtue of tube SO, Fig. 5, at the main station conducting, tube ST, Fig. 6, at the outstation will strike and again start off the multivibrator MVA1, MVB1.

(*b*) Tube RA1, Fig. 7, will strike on the first B pulse extinguishing tube RB1 which ensures that tube SZ will not strike on the second A pulse.

(*c*) Tubes RA2 and RB1 will strike on the second A pulse, extinguishing tubes RB2 and RA1.

(d) Tube RA1 will not strike on the second B pulse and thus does not extinguish tube RB1 since the line is at mark.

(*e*) Tubes RB2 and RA3 strike on the third A pulse extinguishing RA2 and RB3.

(*f*) Tubes RA1 cannot strike on the third B pulse as the line is still at mark.

(*g*) Tubes RB3 and RA4 strike on the fourth A pulse.

(*h*) Tube RA1 cannot strike on the fourth B pulse as the line is still at mark.

(*i*) Tubes RB4 and RB5 strike on the fifth A pulse.

(*j*) Tube RA1 strikes on the fifth B pulse as the line is now at space and tube RB1 is extinguished.

(*k*) Tubes RB1, RA2, RB2 and RA6 strike on the sixth A pulse extinguishing tubes RA1, RB2, RA5 and RB6.

(*l*) Tube RA1 strikes on the sixth B pulse and since the line is still at space, tube RB1 is extinguished.

(*m*) Tubes RB1, RA3, RB6 and RSZ strike on the seventh A pulse extinguishing tubes RA1, RB3 and RA6.

Figure 8:
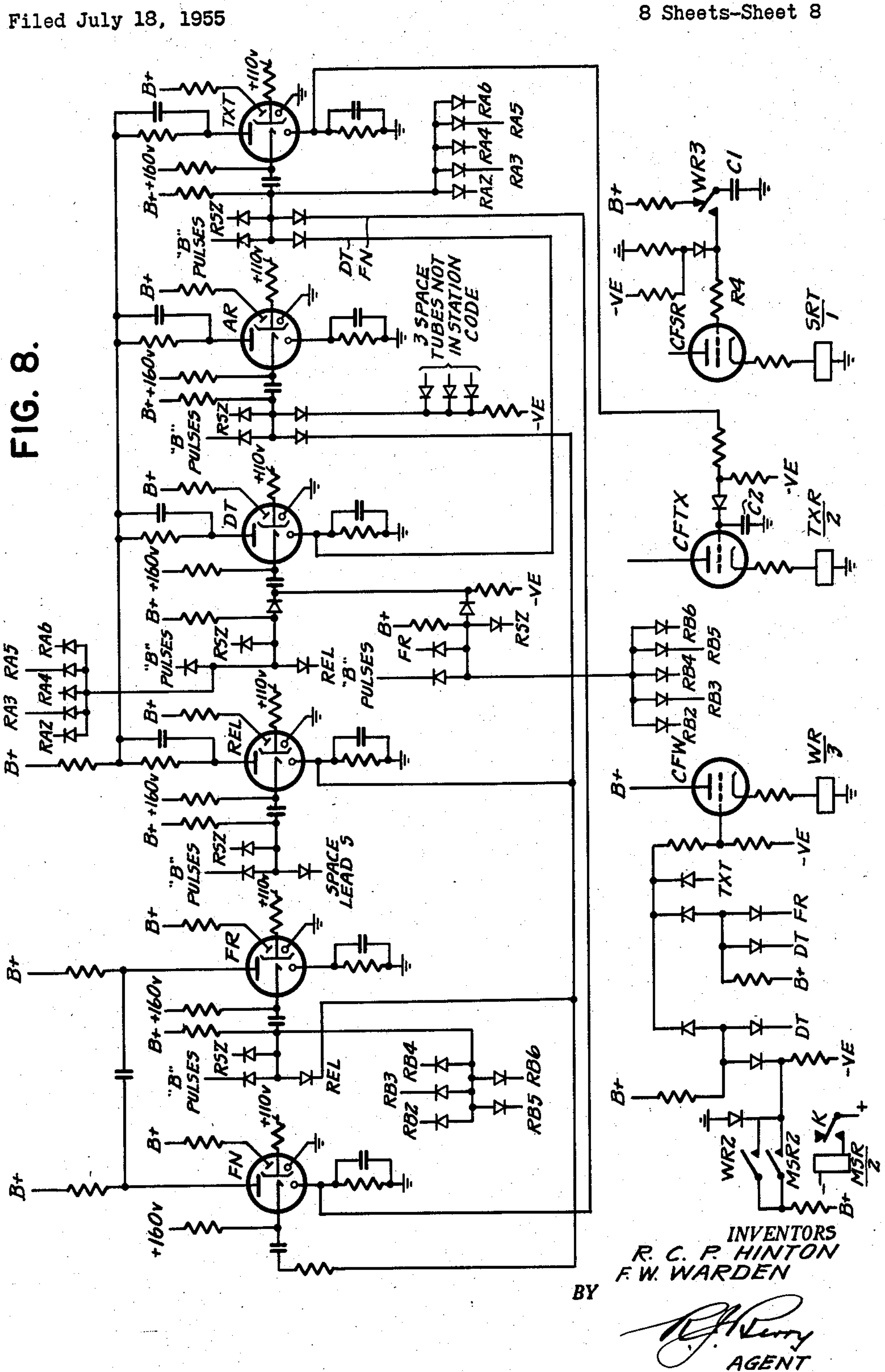
Fig. 8 is a circuit diagram of the electronic control circuit at an outstation.

(*n*) The next B pulse, which is the seventh, transfers the information stored in the register by striking the selector tube DT in the control circuit of Fig. 8, at the outstation corresponding to the called code. In the present example, the code which has been transmitted by the central station is M, M, M, S, S, which has resulted in the firing of the tubes RB6, RB5, RB4, RA3 and RA2, in the register, Fig. 7. Tube RSZ is also conducting by virtue of the start space being received. The tributory station which is selected has the trigger of the gas tube DT, Fig. 8, in its control circuit gated by B pulses and by RA2, RA3, RB4, RB5 and RB6 conductors and also by cathode conductors from tubes RSZ and REL. The tube REL is at this time conducting. Since all the outstation codes are different but are composed of three mark elements and two space elements, at each outstation not selected by the code which has been transmitted, one rectifier of the three on the gate to the trigger of gas tube AR designated as going to the three space tubes not in the station code, must necessarily go to tubes RA2 and RA3. Thus at all outstations other than the one whose code has been transmitted, the gas tube AR will strike instead of the tube DT. Should tube AR strike nothing further happens in the circuit of Fig. 8, until tube REL strikes again because a long introductory space preceding another calling code has been received. (When tube AR strikes the reduction of anode potential on the tube REL deionized that tube.) If tube DT strikes, however, there are two possibilities; either a relay MSR (see Fig. 1), is not operated, indicating that no message is waiting to be transmitted from the outstation, or the relay MSR is operated by actuation of the operator's send key K, meaning that a message is awaiting transmission. In the first case nothing further happens at the outstation, no space is received at the central station and hence tube RR, Fig. 3 thereat, strikes on the next A pulse as previously described and generates a long space, causing the striking of tube REL, Fig. 8, at all the outstations and the sequence is repeated by calling the next outstation code, as previously described.

(*o*) The seventh B pulse coincident with tube RSZ conducting also strikes tube SZ, Fig. 6, a time lag of the order of 10 ms. being permissible on a 45 Baud channel. Relay SZR, operates restoring all the tubes of the register circuit of Fig. 7 to their initial state.

(*p*) With relay MSR operated, gas tube CFW, Fig. 8, is triggered by closure of contacts MSR2 after tube DT conducts, and relay WR is operated. The closure of contacts WR3 causes tube CFSR to conduct for a period of time *t* adjusted by the time delay circuit comprising resistor R4 and condenser C1 to be greater than 1½ elements and less than 3 elements, that is, for a 45 Baud telegraph system between 33.3 and 66.7 ms. Relay SRT in the cathode lead of tube CFSR operates and at contacts SRT1 puts the line to space for such time (see Fig. 1).

Taking time 0 as being that time at which the central station put the line to space preparatory to transmitting the station code, the space sent from the tributory station by the operation of relay SRT will be applied to the line at a time equal to 6½ elements, plus the operating time of relay WR, the operating time of relay SRT and transmission delays. This time must be greater than 7½ elements and less than 9 elements for satisfactory operation. Since it proceeds for 1½ elements minimum, it means that the line is at space under conditions when there is a coincidence between potential from cathode No. 9 of timer tube ET and B pulses on the trigger of gas tube SR, Fig. 3, in the control circuit at the central station. Thus, this gas tube SR strikes when and only when the tributory station called answers back due to the fact that it has a message waiting to be transmitted. The igniting of gas tube SR extinguishes gas tube CS.

As described in connection with Fig. 1, the change of potential on the output lead of tube SR is used as a signal to cause a hunting switch F to take into use a free connecting circuit, such as T2, in any well-known manner. When a free connecting circuit is found a signal is sent back in known manner to cause the operation of relay SX, Fig. 4 which at contacts SX1 applies positive potential to rectifier R5. This potential coincident with positive potential on lead SR cause a positive bias to be applied to the suppressor grid of gating tube GET sufficient to permit it to pass B pulses to the timer tube ET.

The next two B pulses step tube ET to cathode No. 10 and No. 1, respectively. In position No. 10 coincidence of potential on ET10 and SR and the B pulse triggers space output tube SO, Fig. 5, causing the operation of relay TR which puts the line to space. The following four B pulses step tube ET successively to cathodes 2, 3, 4 and 5 during which period the tube SO remains conducting and holds the line at space. In position 5 coincidence of positive potential on ET5 and SR and the B pulse triggers mark output tube MO, which puts the line to mark and causes tube SO to deionize. The same B pulse causes tube ET to step from cathode 5 to 6. The next two B pulses step tube ET to cathodes 7 and 8. The line remains at mark in position 8 of tube ET.

The next A pulse coincident with potential on leads ET8 and SR triggers tube TX, Fig. 3, which extinguishes tube SR and prevents any further stepping of tube ET while the line remains at mark. Thus a start space one element long has been sent to line, followed by four elements of space and then the line has been returned to mark for an indefinite period. This constitutes a "transmit" character signal sent to line from the central station, but it will be seen from Figs. 8 and 1 that nothing is received from line at an outstation and nothing can be sent from an outstation unless the relay WR is operated and a shunt removed from the line at relay contacts WR1.

The "transmit" character is stored in the outstation register, Fig. 7 and as soon as tube RSZ is fired the next B pulse to occur after this ignites tube TXT due to the coincidence of potential on leads DT, FN, RSZ and potential leads RA2, RA3, RA4, RA5, RA6 from the storage tube of Fig. 7 corresponding to the "transmit" code S S S S M. Tube TXT conducting, applies a positive potential to the grid of a triode CFTX thereby operating a relay TXR in its cathode lead. Relay TXR opens its contacts TXR1 (see Fig. 1) and closes contacts TXR2 to cause the outstation transmitter to transmit the waiting message, which is received over the connecting circuit T2 at the central station.

Release can be initiated at the central station whilst tube TX, Fig. 3, is conducting, by actuating a key KR to trigger the tube RR. Tube RR causes tube RE to conduct on the next A pulse, and tube RR in turn causes the striking of tube CS. The previously described cycle of operations is now gone through by the timer ET, Fig. 4, except that the code of the next outstation in turn is sent as determined by the position of the code selector tube SS.

Similarly, an outstation, once tube TXT, Fig. 8 is fired and relay TXR operated, can release by releasing key K (see Fig. 1) and deenergizing relay MSR which at contacts MSR1 opens the line, putting it to space. After 6½ elements of space on the line, tube RE, Fig. 3 strikes at the central station and tubes REL, Fig. 8, strikes at all the outstations, in the manner previously described. At the selected outstation, tube TXT is extinguished, which causes the extinction of tube CFTX, relay TXR is made slow to release in order that should there be any difference in the speeds of the various multi-vibrators, all the outstations will detect this long space provided that the speeds of such multi-vibrators are within their specified tolerance.

The circuit to the grid of the triode CFW contains a holding contact WR2 of relay WR, in parallel with the contacts MSR2 of relay MSR, in order that the outstation, even though relay MSR is released after the 1½ element answerback space has been sent and before the "transmit" character has been fully received, will still release automatically. If this contact WR2 were not inserted, when relay MSR released, positive potential would be removed from grid of tube CFW and relay WR would release, shunting out the outstation at contacts WR1. Thus, the long space release which would be automatically sent as soon as relay TXR operated, with MSR unoperated, would not get to the line. The system would, under these circumstances, remain out of action waiting for this outstation to transmit since it has sent the answer back space to indicate that it wished to do so, when in fact it is not going to do so.

Any outstation may be called out of turn, without affecting the automatic calling sequence, in the following manner: Contacts X1 and X2, Fig. 3, in the gating circuits to the trigger electrodes of tubes CS and RX, are operated either manually or by means of a relay under the control of an operator at the central station. After the connection existing when these contacts are operated, has been released by the generation of a long space, as previously described, the tube RE is caused to conduct in the normal manner, but instead of tube CS then conducting, RX will be caused to strike since the lead RE to the trigger of tube CS is interrupted at contacts X1 and positive potential on lead RE is connected up at contacts X2 to the gate circuit of tube RX coincident with the line going back to mark the next A pulse. Tube RX, therefore, conducts but no further action is taken by the central station, beyond signaling back over a connecting circuit, such as T2 (see Fig. 1), that the party line is now in a position to receive the call. The calling party connected to the connecting circuit T2 then sends a "prepare to receive" character, M, M, M, M, M, which is stored in the register (Fig. 7), at each outstation in the same manner that the normal calling codes are stored. The output leads from register relays RB2, RB3, RB4, RB5 and RB6, representing this "prepare to receive" character are connected over rectifiers to the gating circuit leading to the trigger of gas tube FR, Fig. 8, which conducts on the next B pulse. This prevents tube TXT from striking by extinguishing tube FN and thus prevents any waiting message being transmitted from the particular outstation, since such a message almost certainly would not be destined for the calling party. The calling party now sends the code call of the particular outstation to which he desired to transmit. As already fully described in connection with cyclical calling, the transmitted code causes the striking of tube DT, Fig. 8, at the selected outstation and of tubes AR at all other stations. The 1½ elements of space are then automatically sent from the selected outstation, as already described, to inform the calling party that the called outstation is ready to receive, and on receipt of this signal by the calling party, the message may then be sent.

If it is desired to send a broadcast message from the central station simultaneously to all the outstations on the party line, this may be done by transmitting a second "prepare to receive" character M, M, M, M, M instead of the code of a particular outstation. Since the tube FR at each outstation has already been struck consequent upon the receipt of the first "prepare to receive" character M, M, M, M, M, the receipt of the second "receive" character at each outstation now fires the tube DT since positive potential on the output leads from the register circuit relays RB2, RB3, RB4, RB5 and RB6 is applied to a gating circuit connected to the trigger electrode of tube DT coincident with potential from tubes FR and RSZ on the next B pulse. Each outstation, therefore, sends 1½ elements of space, in the manner already described, to all intents and purposes at the same time, which informs the calling party that the broadcast message may be transmitted. Under these circumstances only the calling party is able to effect release. If any outstation wishes to reply, it has to await its turn in the normal manner. However, a particular outstation could be given the opportunity to reply if a suitable second "receive" character were chosen and connections made from the appropriate register relays RA1 to RA6 and RB1 to RB6 to the gating circuit of tube TXT at this outstation. In these circumstances tube TXT could be made to conduct after the calling party had sent its message and if the outstation wished to answer. The firing of tube TXT with relay MSR operated would allow the answer to be sent, but otherwise with relay MSR unoperated, the outstation would release.

Subsequent to the release of the outstations, tube CS, Fig. 3, at the central station will be caused to conduct if tube RE strikes, and the sequence code tube SS, Fig. 4, will be caused to step, and the outstation next in turn after the one called immediately previous to the incoming call, will be called in the manner already fully described.

It will be noted that the central station continuously monitors the line for a long space release condition as soon as either tube RX or TX (Fig. 3), at the central station is conducting. On referring to Fig. 4, it will be noted that output leads from tubes TX and RX and the space lead are connected to a gating circuit to the suppressor of grid tube GET. The element timer, ET will, therefore, step once for each element of space commencing at cathode No. 10. If the line goes to mark it is reset to cathode No. 10, but should it reach cathode No. 7, potential on ET7, the space lead and lead TX, together with an A pulse, will fire the tube RE. Tube RE always strikes, therefore, if the line has been at space for a minimum of 7½ elements. Once tube RE is conducting, either tube CS or RX is caused to strike, and the circuits function to release, as already described.

While we have described above the principles of our invention in connection with specific apparatus, it is to be clearly understood that this description is made only by way of example and not as a limitation to the scope of our invention.

What is claimed is:

1. A communication system comprising a central station, a plurality of outstations associated with a party line extending to said central station each of said outstations being allotted a distinctive code calling signal, a generator at said central station for producing timed electrical pulses, a multi-gap gas discharge timer tube and a multi-gap gas discharge code sequence tube at said central station, means at said central station for successively transmitting said code calling signals over said party line under the control of said timed pulses, said timer tube and said code sequence tube, register means at each outstation for receiving said code signals, means at each outstation adapted for actuation when the respective outstation is waiting to transmit a message, and means at each outstation jointly responsive to the receipt by said register means of a code calling signal distinctive of that outstation and to the actuation of said last-mentioned means for automatically establishing a signalling channel between said outstation and said central office.

2. A communication system according to claim 1 further comprising means at each outstation responsive to the receipt by its register means of a code calling signal different from its own distinctive code calling signal, for locking out said outstation from said party line until the central station resumes the transmission of code calling signals.

3. A communication system comprising a central station, a plurality of outstations associated with a party line extending to said central station each of said outstations being allotted a distinctive code calling signal comprising mark and space elements, means at said central station for transmitting in succession over said party line the code calling signals of each of said outstations, a pulsed gas discharge tube at said central station for transmitting a long space signal preceding each code calling signal, calling code signal receiving means at each outstation, means at each outstation adapted to respond to said long space signal, means at each outstation responsive to said last-mentioned means for preparing said code signal receiving means to receive a code signal, means at each outstation for indicating when a message awaits transmission and means at each outstation jointly responsive to actuation of said last-mentioned means and to the setting of said code signal receiving means in accordance with the code distinctive of the respective outstation for automatically establishing a signalling channel between said outstation and said central station.

4. A communication system according to claim 3, further comprising a multivibrator circuit for producing timed electrical pulses at each outstation, means responsive to the receipt by a respective outstation of said long space signal for causing said circuit to commence to generate timed pulses, and means for causing said code signal receiving means at a respective outstation to store the received code signal under the joint control of the code signal and said timed pulses.

5. A communication system comprising a central station, a plurality of outstations associated with a party line extending to said central station each of said outstations being allotted a distinctive code calling signal, means at said central station for successively transmitting said code calling signals over said party line, pulse generators producing two interlaced pulse trains 180° out of phase at said central station, means at each outstation for receiving said code calling signals, discriminating means at each outstation adapted for actuation to indicate when the respective outstation is awaiting to transmit a message, register means at each outstation for storing said code signals, and means at each outstation controlled by said discriminating means and said register means for preparing a signal channel from the respective outstation to said central station in the event that the code received by said register means corresponds to the distinctive code of said outstation and a message is awaiting transmission and for transmitting a supervisory signal over said party line to said central station in the event that no message is awaiting transmission at said outstation.

6. A communication system according to claim 5, further comprising means at said central station for receiving said supervisory signal and means responsive to the actuation of said last-mentioned means for initiating the transmission of the next code calling signal.

7. A communication system comprising a central station including means for continuously generating two trains of timing pulses of like frequency, a gaseous discharge timing tube and code sequence tube controlled by said pulses, a plurality of outstations associated with a party line extending to said central station each of said outstations being allotted a distinctive code calling signal composed of a plurality of equal length space and mark elements, means at said central station for successively transmitting said code calling signals over said party line, means at each outstation for receiving said code calling signals, register means at each outstation for storing said code signals and means at each outstation controlled by said register means for preparing a signal channel from the respective outstation to said party line in the event that the code received by said register means corresponds to the distinctive code of said outstation, and for preventing the reception of further signals by the respective outstation in the event that the code received by said register means does not correspond with its distinctive code.

8. A communication system according to claim 7, further comprising means at each outstation for transmitting an answering signal to said central exchange in the event that the code received by said register means corresponds to the distinctive code of said outstation and that a message is awaiting transmission at said outstation.

9. A communication system according to claim 7, further comprising means at said central station for transmitting a further distinctive signal over said party line, means at each outstation for selectively responding to said last-mentioned signal in the event that the code received by said register means corresponds to the distinctive code of the respective outstation and that a message is awaiting transmission thereat, and means at the respective outstation under the control of said last-mentioned means for initiating the transmission of the waiting message over said party line.

10. A communication system according to claim 7, further comprising means at said central station for transmitting a further distinctive code signal composed of a plurality of equal length space and mark signal elements, selective means at each outstation for responding to said further code signal, and means at each outstation controlled by said last-mentioned means for prohibiting the transmission of a waiting message.

11. A communication system according to claim 7, further comprising means at said central station for transmitting a further distinctive code signal composed of a plurality of equal length space and mark signal elements, means at each outstation for responding to said further code signal, and means at each outstation responsive to the operation of said last-mentioned means for preparing the respective outstation to receive a broadcast message from said central station.

12. A communication system according to claim 7, further comprising means at said central station for transmitting a further distinctive signal over said party line, means at each outstation for selectively responding to said last-mentioned signal in the event that the code received by said register means corresponds to the distinctive code of the respective outstation and that a message is awaiting transmission thereat, means at the respective outstation under the control of the last-mentioned means for initiating the transmission of the waiting message over said party line, means at said central station for transmitting a release signal after said further distinctive signal, means at each outstation for responding to said release signal and means controlled by said last-mentioned means for restoring the equipment at the respective outstation.

13. A communication system according to claim 7, further comprising means at each outstation for transmitting an answering signal to said central exchange in the event that the code received by said register means corresponds to the distinctive code of said outstation and that a message is awaiting transmission at said outstation, means at each outstation for transmitting a release signal following upon said answering signal, means at said central station for responding to said release signal and means controlled by said last-mentioned means for restoring the equipment at said central station.

14. A telegraph system comprising a central station including means for generating two separate trains of timing pulses having a predetermined phase relation to each other, a plurality of outstations associated with a party line extending to said central station each of said outstations being allotted a distinctive code calling signal comprised of a plurality of equal length space and mark signal elements, means for transmitting in succession over said party line the code calling signals of each of said outstations at said central station, means for inserting before each said code calling signal an additional signal element of predetermined longer duration than any of the signal elements comprising said code calling signals, and means at each outstation responsive to said signal of longer duration for preparing the outstation to receive the calling code signals transmitted by said central station.

15. A telegraph system according to claim 14, in which each distinctive code calling signal comprises three mark elements and two space elements.

16. A telegraph system comprising a central station including means for separately generating trains of timing pulses 180° out of phase, a plurality of outstations associated with a party line extending to said central station each of said outstations being allotted a distinctive code calling signal consisting of a plurality of equal length mark and space elements, means at said central station for successively transmitting said code calling signals over said party line, means at said central station for inserting before each said code calling signal a further signal of longer duration than the overall duration of said mark and space elements, means at each outstation for receiving said code calling signals, a generator of two interlaced trains of pulses at each outstation responsive to said signal of longer duration for initiating the operation of said last-mentioned means, means at each outstation adapted for actuation when the respective outstation is in a condition requiring it to communicate with said central station, and means at each outstation joinly responsive to the receipt of the code calling signal of that outstation and to the actuation of said last-mentioned means for automatically establishing a signalling channel between said outstation and said central station.

References Cited in the file of this patent

UNITED STATES PATENTS

| | | |
|---|---|---|
| 2,351,621 | Light | June 20, 1944 |
| 2,454,301 | Bacon | Nov. 23, 1948 |
| 2,599,988 | Halvorsen | June 10, 1952 |
| 2,652,446 | Oberman | Sept. 15, 1953 |
| 2,664,459 | Oberman | Dec. 29, 1953 |
| 2,667,533 | Zenner | Jan. 26, 1954 |
| 2,675,537 | Cahill | Apr. 13, 1954 |
| 2,690,548 | Joel | Sept. 28, 1954 |
| 2,703,338 | Stiles | Mar. 1, 1955 |